(12) United States Patent
Aoki et al.

(10) Patent No.: US 6,971,669 B2
(45) Date of Patent: Dec. 6, 2005

(54) PASSENGER DISCRIMINATING APPARATUS

(75) Inventors: Hiroshi Aoki, Tokyo (JP); Tadayuki Ato, Tokyo (JP)

(73) Assignee: Takata Corporation, Tokyo (JP)

( * ) Notice: Subject to any disclaimer, the term of this patent is extended or adjusted under 35 U.S.C. 154(b) by 523 days.

(21) Appl. No.: 09/778,861

(22) Filed: Feb. 8, 2001

(65) Prior Publication Data

US 2001/0033074 A1 Oct. 25, 2001

Related U.S. Application Data

(60) Provisional application No. 60/181,937, filed on Feb. 11, 2000, provisional application No. 60/182,216, filed on Feb. 14, 2000, and provisional application No. 60/182,906, filed on Feb. 16, 2000.

(51) Int. Cl.[7] ............................................. B60R 21/32
(52) U.S. Cl. ...................................... 280/735; 180/272
(58) Field of Search ................................ 280/735, 734; 180/272, 273

(56) References Cited

U.S. PATENT DOCUMENTS

| | | | | |
|---|---|---|---|---|
| 5,074,583 A | * | 12/1991 | Fujita et al. ................. | 180/271 |
| 5,411,289 A | * | 5/1995 | Smith et al. ................. | 180/271 |
| 5,474,327 A | * | 12/1995 | Schousek ..................... | 280/735 |
| 6,056,079 A | * | 5/2000 | Cech et al. .................. | 177/144 |
| 6,186,538 B1 | * | 2/2001 | Hamada et al. ........... | 280/728.2 |
| 6,260,879 B1 | * | 7/2001 | Stanley ....................... | 180/268 |
| 6,275,146 B1 | * | 8/2001 | Kithil et al. .............. | 340/425.5 |
| 6,292,727 B1 | * | 9/2001 | Norton ....................... | 180/271 |
| 6,366,200 B1 | * | 4/2002 | Aoki ........................... | 340/438 |
| 6,371,513 B1 | * | 4/2002 | Fujimoto et al. ......... | 280/730.2 |

FOREIGN PATENT DOCUMENTS

| | | |
|---|---|---|
| JP | 2000-12463 | 1/2000 |
| JP | 2000-121463 | 4/2000 |

* cited by examiner

*Primary Examiner*—Faye M. Fleming
(74) *Attorney, Agent, or Firm*—Foley and Lardner LLP

(57) ABSTRACT

An airbag system including a passenger discriminating apparatus that can accurately recognize the type of the person being seated on a vehicle is provided. The discriminating apparatus receives input from a seat weight sensor and human proximity sensors and determines whether a child, an adult, or a child seat is mounted on the seat. The discriminating apparatus provides a signal to an airbag controller that controls the deployment of either a side or front airbag in either the soft or normal mode.

7 Claims, 2 Drawing Sheets

(A)

(B)

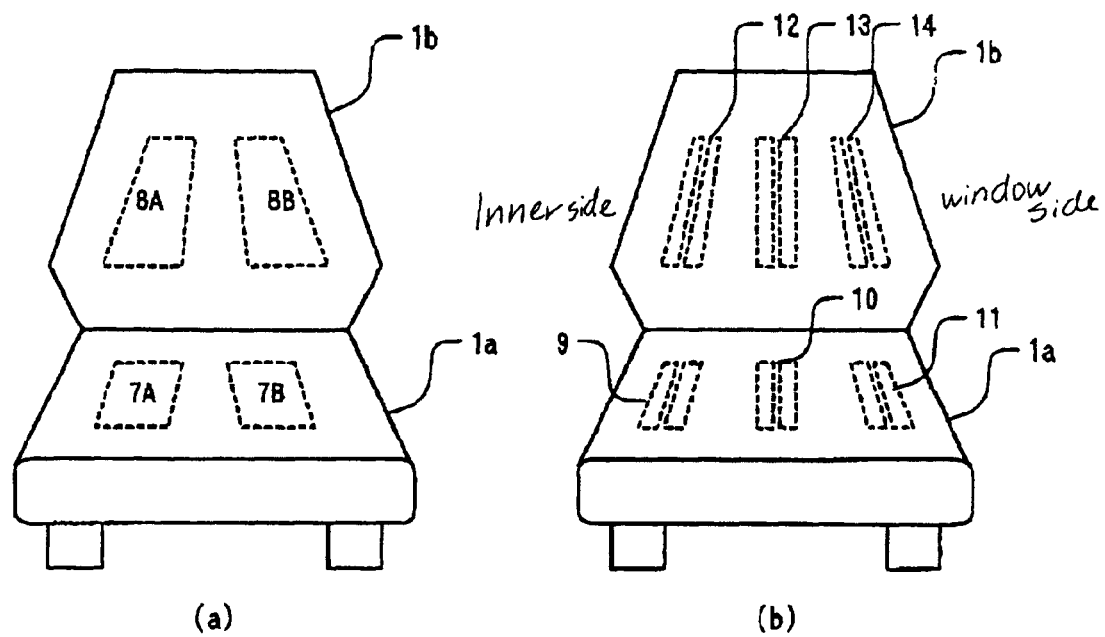

PASSENGER DISCRIMINATING APPARATUS

CROSS REFERENCE TO RELATED APPLICATIONS

This application claims priority to and the benefit of the following U.S. Provisional Patent Applications:

U.S. Provisional Patent Application Ser. No. 60/181,937 filed Feb. 11, 2000

U.S. Provisional Patent Application Ser. No. 60/182,216 filed Feb. 14, 2000

U.S. Provisional Patent Application Ser. No. 60/182,906 filed Feb. 16, 2000

Each of the forgoing provisional applications is incorporated by reference herein in its entirety.

BACKGROUND OF THE INVENTION

The present invention relates to an airbag system that includes a passenger discriminating apparatus for discriminating or determining the type of a person being seated on or an object being placed on the seat of the automotive vehicle, and an airbag controlling apparatus that controls deployment of the airbags.

Hitherto, in the automotive vehicle, the airbag apparatus (the front airbag apparatus, the side airbag apparatus) has been mounted for protecting the human body in case of collision. When an infant is on board, it is obligated to mount a child seat and to restrain the infant seated thereon.

When an infant is restrained on the child seat, it is desired that the airbag is cut off or deployed at a slower speed than the normal speed (soft deployment) in general.

When a child is seated, the airbag may generally be deployed in a normal manner. However, when the child is sitting while leaning against the door, it is preferable that the side air bag performs soft deployment.

Accordingly, with the aim of controlling deployment of the airbag, it is required to recognize the type of the person being seated on the seat and to recognize the presence or absence of a child seat. For such recognition, in the related art, a seat weight sensor for measuring the weight of an object placed on the seat, and for the discrimination of a child seat (including the case where an infant is seated), a child, or an adult has been developed. This type of seat weight sensor is known as shown in Japanese Unexamined Patent Publication No. 2000-121463.

However, when discrimination is only performed by the use of the seat weight sensor, inaccurate recognition of the type of the person being seated on the seat or of the child seat would happen. For example, when the child seat is restrained on the seat by a seat belt, the weight measured by the seat weight sensor would be larger than that measured with a child seated. In addition, when the passenger is leaning on the door, especially when placing his/her arm on the window, the weight measured by the seat weight sensor would be smaller than the actual weight, whereby a lightweight adult would be improperly recognized as a child.

SUMMARY OF THE INVENTION

With such a circumstance in view, it is an object of the present invention to provide a passenger discriminating apparatus that can recognize the type of the person being seated on the seat or the child seat placed thereon, and an airbag controlling apparatus employing the same.

In accordance with the present invention a passenger discriminating apparatus for discriminating the presence of the passenger being seated on the seat of the automotive vehicle and the type of the passenger is provided. The discriminating apparatus comprises: a seat weight sensor for measuring the weight of the passenger or the object on the seat, and a human body proximity sensor for detecting the extent of proximity between the person being seated on the seat and the seat, wherein said passenger discriminating apparatus comprises means for discriminating the presence of the passenger being seated on the seat and the type of the passenger by the combination of said seat weight sensor and the human body proximity sensor.

A signal from the human body proximity sensor may be used as a signal for discriminating the passenger in addition to a signal from the seat weight sensor. Therefore, discrimination between the child seat and the child being seated can be accurately determined and thus the recognition of the person sitting on the seat and the type of the child seat can be made accurately.

According to an alternative embodiment of the present invention, the passenger discriminating apparatus may include a plurality of human body sensors. At least one of the human body sensors is a sensor that detects the proximity of the human body when the passenger is being seated in a posture leaning against the door (the first human body proximity sensor). At least another one of the human body sensors is a sensor that does not detect the proximity of the human body when the passenger is being seated in the posture leaning against the door (the second human body proximity sensor).

When the passenger is seated in the posture leaning against the door, the weight detected by the seat weight sensor is lower than the actual weight. According to the present invention, since the posture of the human body described above can be detected by the first human body proximity sensor and the second human body proximity sensor, evaluation of the value detected by the seat weight sensor can be changed correspondingly.

According to a further embodiment of the present invention the passenger discriminating apparatus is configured so that it determines that there is no passenger when the output of said seat weight sensor is not more than the first threshold value. The discriminating apparatus determines that a child is sitting directly on the seat when the output of said seat weight sensor exceeds the first threshold value and not more than the second threshold value and said human body proximity sensor detects the proximity of the human body. The discriminating apparatus determines that a child seat is mounted when the output of said seat weight sensor exceeds the first threshold value and not more than the second threshold value and said human body proximity sensor does not detect the proximity of the human body. The discriminating apparatus determines that an adult is being seated when the output of said seat weight sensor exceeds the second threshold value and said human body proximity sensor detects the proximity of the human body. Finally, the discriminating apparatus determines that a child seat is mounted when the output of said seat weight sensor exceeds the second threshold value and said human body proximity sensor does not detect the proximity of the human body.

According to this embodiment, the type of passenger is determined mainly by the output of the seat weight sensor. In other words, the apparatus determines that there is no passenger when the output of said seat weight sensor is not more than the first threshold value. As described above, the discriminating apparatus determines that a child or a child seat is on the seat when the output thereof exceeds the first threshold value and not more than the second threshold value. The apparatus determines that an adult or a child seat is on the seat when the output thereof exceeds the second threshold value. When the output thereof exceeds the first threshold value and is not more than the second threshold value, the human body proximity sensor is used for discriminating between a child and a child seat. Also, when the output thereof exceeds the second threshold value, the human body proximity sensor is used for discriminating between an adult and a child seat. In other words, when the human body proximity sensor detects the proximity of the human body, it is determined that either a child or an adult is seated. When the proximity sensor does not detect the proximity of the human body, it is determined that a child seat is mounted. Therefore, according to the present invention, determination among a child seat, a child, and an adult can be made accurately.

According to yet a further embodiment of the present invention, the passenger discriminating apparatus may be configured to function to decrease the value of said second threshold value by a prescribed amount when said first human body proximity sensor detects the proximity of the human body and said second human body proximity sensor does not detect the proximity of the human body.

When the first human body proximity sensor detects the proximity of the human body and the second human body proximity sensor does not detect the proximity of the human body, it is determined that the passenger is sitting on the seat and leaning on the door. According to the present invention, in such a case, the threshold value for discriminating between an adult and a child is decreased by a prescribed amount.

Therefore, the present invention avoids mistaking an adult for a child when the seat weight is smaller than the actual weight.

A further embodiment of the present invention includes an airbag controlling apparatus for controlling deployment of the airbag. The apparatus is configured to carry out cut-off or soft deployment of the front airbag only when at least a child is sitting on the seat or a child seat is mounted thereon. The apparatus is configured to carry out normal deployment in other cases, after receiving a signal from a passenger discriminating apparatus such as, for example, described above.

The airbag controlling apparatus provides for accurate control of airbag deployment while exactly recognizing the state of the passenger, so that cut-off or soft deployment is carried out only when the passenger discrimination apparatus determines that the object placed on the seat is a child or a child seat. In addition, it is configured not to deploy the air bag when the seat is vacant.

The present invention includes an alternative embodiment of an airbag controlling apparatus for controlling deployment of the airbag. The controlling apparatus is configured to carry out cut-off or soft deployment of the side airbag when at least a child is sitting on the seat or a child is mounted thereon and further when the first human body proximity sensor detects the proximity of the human body and the second human body proximity sensor does not detect the proximity of the human body, and to carry out normal deployment in other cases, receiving a signal from the passenger discriminating apparatus.

In the airbag controlling apparatus, since cut-off or soft deployment is carried out only when the passenger discriminating apparatus determines that what is on the seat is a child seat or a child sitting near the door, accurate control of soft deployment can be expected.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below

FIG. 2 is a schematic drawing of the human body proximity sensor.

DETAILED DESCRIPTION OF THE PREFERRED EMBODIMENTS

Figure 1:
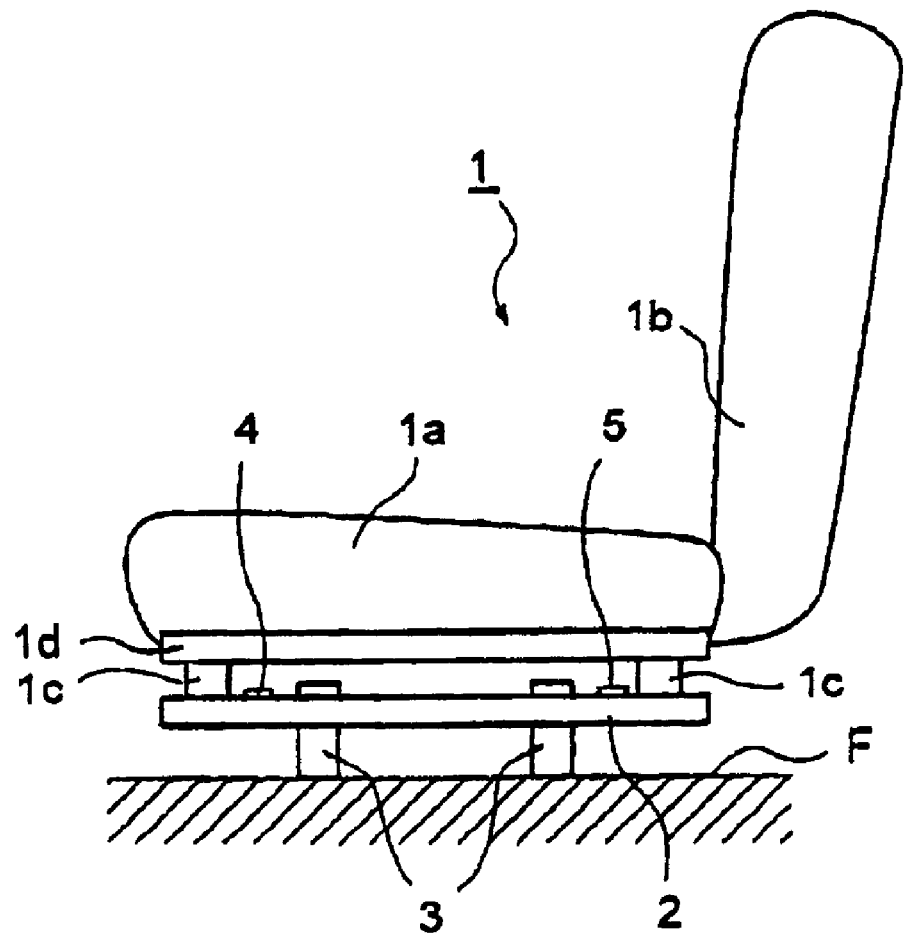
FIG. 1 is a schematic drawing of the seat weight sensor.
Figure 1:
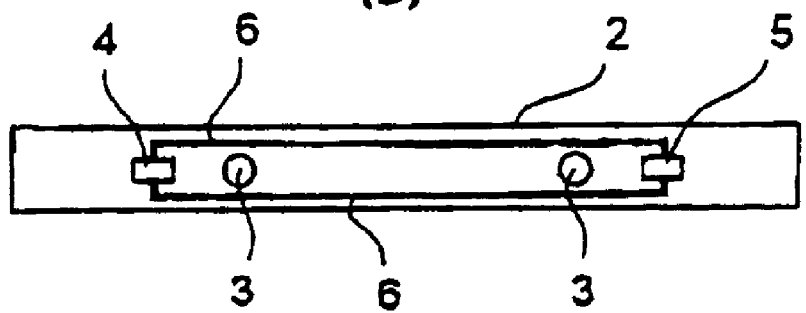

Referring now to the drawings, examples of the embodiment of the present invention will be illustrated. FIG. 1 is a schematic drawing showing an example of the structure of the seat weight sensor. In FIG. 1, a seat 1 comprising a seat cushion 1a, seat back 1b, seat rail 1c, and a seat leg 1d is supported by the displacing member 2, and said displacing member 2 is supported by the bracket 3 on the floor F. The displacing member 2 formed of steel is integrally provided with load sensors 4, 5 and a printed wiring 6 by printing technique. When the load of the seat 1 is transmitted to the displacing member 2 via the seat leg 1d, the displacing member 2 bends with fulcrums at the brackets 3 and the point of force at the seat leg 1d, and the displacement is detected by the load sensors 4, 5.

Such displacing members are mounted on the left and right sides of the seat, whereby four load sensors in total are mounted on the front, rear, right and left. By summing the outputs from these four load sensors, and then subtracting the weight of the seat in itself, the weight of the object mounted on the seat or of the passenger is obtained.

FIG. 2 is a drawing illustrating an example of the human body proximity sensor mounted on the seat. In FIG. 2(a), reference numerals and signs 7A, 7B, 8A, and 8B designate electrodes. Electrodes 7A and 7B are embedded in the seat cushion 1a, and electrodes 8A and 8B are embedded within the seat back 1b. By detecting the capacitance between the lower electrodes 7A and 7B, and the capacitance between the upper electrodes 8A and 8B, whether the human body is in the proximity of the seat or not is detected.

In other words, since the capacitance between the electrodes 7A and 7B increases when the passenger sets on the seat cushion 1a directly, and the capacitance between the electrodes 8A and 8B increases when the passenger leans against the seat back 1b, the proximity of the passenger can be detected. In contrast to this, even when the child seat is mounted and an infant is seated on said child seat, the capacitance between these electrodes does not increase.

The FIG. 2(b) shows an example in which such pairs of electrodes are provided at three locations of 9, 10, and 11 in the seat cushion 1a, and three locations of 12, 13, and 14 in the seat back. In such an arrangement of electrodes, when the passenger is seated while leaning against the door, the capacitance between the electrodes 10 and 13 in the center and between the electrodes 11 and 14 increase and the capacitance between electrodes 9 and 12 on the inner sides does not increase. When the passenger is taking the normal seating position, the capacitances of the three human body proximity sensors in the seat cushion 1a increase.

Though an example in which the human body proximity sensors are provided in the seat cushion 1a and the seat back 1b is illustrated, providing said sensor only in the seat cushion 1a is sufficient. Since the human body proximity sensor provided in the seat back 1b does not detect the proximity when the passenger slouches, it is not necessarily preferable for the purpose of the present invention.

Since the capacitance between two electrodes is measured in the example described above, it is also possible to detect the proximity of the human body by measuring the capacitance between each electrode and the body.

Hereinafter, an example in which the seat weight sensor and the human body proximity sensor described so far are combined to determine the type of the passenger. In the first example, two threshold values of a1 and a2 (a1<a2) are determined for the seat weight sensor.

As a first place, the output x of the seat weight sensor is obtained, and when x<a1, it is determined that there is no passenger on board without reservation. When a1<x<a2, it determines whether or not at least any one of the human body proximity sensors 9, 10, and 11 is turned on. When any one of those is turned on, it is determined that a child is on board. When all of those are off, it is determined that a child seat is mounted. When x>a2, it is determined that an adult is on board.

In the second example, the determination changes with the position in which the passenger is seated. In the first place, the output x of the seat weight sensor is obtained, and when x<a1, it is determined that there is no passenger on board without reservation. When x>a1, the output of the human body proximity sensor is determined. When all the human body proximity sensors 9, 10, 11 are off, it is determined that a child seat is mounted.

When at least any one of the human body proximity sensors 9, 10, and 11 are on, whether the condition is such that the human body proximity sensor 9 is off and the human body proximity sensor 11 is on is determined. If not, when a1<x<a2, it is determined that a child is on board, and when x>a2, it is determined an adult is on board. If it is so, the third threshold value a3 in which a1<a3<a2 is defined and when a1<x<a3, it is determined that a child is on board and when x>a3, it is determined that an adult is on board.

In this way, the condition in which the human body proximity sensor 9 is off and the human body proximity sensor 11 is on represents the condition in which the passenger is leaning against the door side (window side), or sitting with his/her arm put on the window frame. In such a case, since the output of the seat weight sensor represents a value smaller than the passenger's actual weight, a new threshold value a3 is provided to correct the amount corresponding thereto and discriminate between an adult and a child.

In this way, when the system can discriminate between the state where a child seat is mounted (including the case where an infant is seated thereon), the state where a child is seated, and the state where an adult is seated, the control of deployment of the airbag can be made according to the discrimination.

For the front airbag, cut-off or soft deployment is carried out when a child seat is mounted or when a child is seated, and normal deployment is carried out when an adult is seated.

When a child or a child seat is positioned in the proximity of the door, it is desired that a side airbag is cut-off or softly deployed. Determination whether or not the child is in the proximity of the door is made in such a manner that when the human body proximity sensor 11 is on and the human body proximity sensor 9 is off, it is determined that the child is in the proximity of the door.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. A passenger discriminating apparatus comprising:
    a seat weight sensor for measuring the weight of an object on the seat; and
    a human body proximity sensor for detecting the extent of proximity between the passenger on the seat and the seat; and
    means for determining the presence of the passenger on the seat and for discriminating the type of passenger;
    wherein said means for determining utilizes an output from the seat weight sensor and an output from the human body proximity sensor; and
    wherein a plurality of said human body proximity sensors are provided; wherein a first human body proximity sensor detects the proximity of the human body when the passenger is being seated in a posture leaning against the door, and a second human body proximity sensor does not detect the proximity of the human body when the passenger is being seated in the posture leaning against the door.

2. A passenger discriminating apparatus comprising:
    a seat weight sensor for measuring the weight of an object on the seat; and
    a human body proximity sensor for detecting the extent of proximity between the passenger on the seat and the seat; and
    means for determining the presence of the passenger on the seat and for discriminating the type of passenger;
    wherein said means for determining utilizes an output from the seat weight sensor and an output from the human body proximity sensor;
    wherein the means for determining is configured to determine that there is no passenger when the output of the seat weight sensor is not more than a first threshold value; and
    wherein the means for determining apparatus is configured to determine that a child is sitting directly on the seat when the output of said seat weight sensor exceeds the first threshold value and is not more than a second threshold value and when said human body proximity sensor detects the proximity of the human body.

3. The discriminating apparatus of claim 2, wherein the means for determining is configured to determine that a child seat is mounted when the output of said seat weight sensor exceeds the first threshold value and is not more than a second threshold value and when said human body proximity sensor does not detect the proximity of the human body.

4. The discriminating apparatus of claim 2, wherein the means for determining is configured to determine that an adult is seated in the seat when the output of said seat weight sensor exceeds the second threshold value and when said human body proximity sensor detects the proximity of the human body.

5. The discriminating apparatus of claim 2, wherein the means for determining is configured to determine that a child seat is mounted on the seat when the output of said seat weight sensor exceeds the second threshold value and when said human body proximity sensor does not detect the proximity of the human body.

6. The passenger discriminating apparatus of claim 2, wherein the means for determining functions to decrease the value of the second threshold value by a prescribed amount when the first human body proximity sensor detects the proximity of the human body and the second human body proximity sensor does not detect the proximity of the human body.

7. An airbag system comprising:
- a passenger discriminating apparatus comprising:
    - a seat weight sensor for measuring the weight of an object on the seat; and
    - a plurality of human body proximity sensors for detecting the extent of proximity between the passenger on the seat and the seat; and
    - means for determining the presence of the passenger on the seat and for discriminating the type of passenger utilizing an output from the seat weight sensor and an output from the human body proximity sensor.
    - wherein a first one of the plurality of human body proximity sensors detects the proximity of the human body when the passenger is being seated in a posture leaning against the door, and a second one of the plurality of human body proximity sensors does not detect the proximity of the human body when the passenger is being seated in the posture leaning against the door; and
- an air bag controlling apparatus for controlling deployment of a side airbag, wherein the controlling apparatus is configured to receive a signal from the passenger discriminating apparatus and controls a soft deployment of the side airbag when at least a child is sitting on the seat or a child seat is mounted thereon and further when the first human body proximity sensor detects the proximity of the human body and the second human body proximity sensor does not detect the proximity of the human body, and to carry out normal deployment in other cases.

* * * * *